US009843762B2

(12) United States Patent
Morcelli et al.

(10) Patent No.: US 9,843,762 B2
(45) Date of Patent: Dec. 12, 2017

(54) IMAGE DISPLAY SYSTEM FOR CALIBRATING A SOUND PROJECTOR

(71) Applicant: STMicroelectronics S.r.l., Agrate Brianza (IT)

(72) Inventors: Alessandro Morcelli, Montello (IT); Andrea Mario Onetti, Besana Brianza (IT); Marco Angelici, Galliate Lombardo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 416 days.

(21) Appl. No.: 13/891,000

(22) Filed: May 9, 2013

(65) Prior Publication Data
US 2013/0300843 A1 Nov. 14, 2013

(30) Foreign Application Priority Data
May 14, 2012 (IT) .............................. MI2012A0831

(51) Int. Cl.
*H04N 9/47* (2006.01)
*H04N 5/60* (2006.01)
(Continued)

(52) U.S. Cl.
CPC .............. *H04N 5/60* (2013.01); *G02C 11/10* (2013.01); *H04N 13/0434* (2013.01); *H04N 21/4122* (2013.01); *H04N 21/42203* (2013.01); *H04N 21/439* (2013.01); *H04N 21/43637* (2013.01); *H04N 21/816* (2013.01); *H04S 7/303* (2013.01);
(Continued)

(58) Field of Classification Search
CPC .. H04N 5/60; H04N 13/0434; H04N 21/4122; H04N 21/42203; H04N 21/43637; H04N 21/439; H04N 21/816; H04S 7/303; H04S 7/301; G02C 11/10; H04R 2205/022
USPC ......... 348/53, 58, 564, 588, 52, 77, 78, 584, 348/589, 738; 345/440, 440.1
See application file for complete search history.

(56) References Cited

U.S. PATENT DOCUMENTS 6,188,442 B1 * 2/2001 Narayanaswami ........... 348/564
7,013,009 B2 * 3/2006 Warren .................. A42B 1/245
379/420.01
(Continued)

FOREIGN PATENT DOCUMENTS

WO 2011/112165 A1 9/2011

*Primary Examiner* — Trang U Tran
(74) *Attorney, Agent, or Firm* — Seed IP Law Group LLP

(57) ABSTRACT

The present disclosure relates to an image display system, including a television having a screen, a sound projector, a control unit in signal communication with said screen and said sound projector, said control unit being configured for said sound projector to project one or more audible beams in a room towards one or more target paths. The system includes an optical instrument having a frame and a pair of lenses, detection means and transmission means, said detection means being designed to receive at their input an audio signal having a frequency falling in a 20-20 kHz frequency band and to output a processed signal, said transmission means being designed to receive at their input said processed signal, and to output a calibration signal. The control unit calibrates said sound projector according to said calibration signal generated by said optical instrument.

18 Claims, 2 Drawing Sheets

(51) Int. Cl.

| | |
|---|---|
| *H04N 13/04* | (2006.01) |
| *G02C 11/00* | (2006.01) |
| *H04N 21/41* | (2011.01) |
| *H04N 21/422* | (2011.01) |
| *H04N 21/4363* | (2011.01) |
| *H04N 21/439* | (2011.01) |
| *H04N 21/81* | (2011.01) |
| *H04S 7/00* | (2006.01) |

(52) U.S. Cl.
CPC ........ *H04R 2205/022* (2013.01); *H04S 7/301* (2013.01)

(56) References Cited

U.S. PATENT DOCUMENTS

| | | |
|---|---|---|
| 8,274,611 B2 | 9/2012 | DeMartin et al. |
| 8,724,026 B2 * | 5/2014 | Macleod ....................... 348/564 |
| 2002/0197961 A1 | 12/2002 | Warren |
| 2006/0153391 A1 | 7/2006 | Hooley et al. |
| 2012/0038827 A1 | 2/2012 | Davis |

\* cited by examiner

IMAGE DISPLAY SYSTEM FOR CALIBRATING A SOUND PROJECTOR

BACKGROUND

Technical Field

The present disclosure relates to an image display system and an associated optical instrument for calibrating a sound projector.

Description of the Related Art

U.S. Pat. No. 8,274,611 discloses the use of an image display system for calibration of a sound projector.

Such U.S. Pat. No. 8,274,611 discloses, referring to FIGS. 8 and 9, that automatic calibration of the sound projector is achieved by providing the image display system with a television and a microphone. Particularly, the microphone is described as being embodied by a standalone device or adapted to be integrated in a control unit external to the television.

Such U.S. Pat. No. 8,274,611 also discloses that the microphone can be coupled over wire or by IR connection to the image display system. The microphone is designed to capture the average sound levels emitted by the sound projector and send them back to the television which uses them via special firmware to calibrate the emission of sounds by the sound projector.

Here, the microphone is usually placed in an area of the room in which the television and the sound projector are located. The microphone should be placed in one of the so-called "hot spots" of the room, i.e., in one of the areas in which the sound signals generated by the sound projector have the maximum sound pressure. Thus, the microphone will detect the "most significant" signals to be used for calibration of the sound projector, for the latter to emit signals that will spread out in the room with even distributions throughout the frequency spectrum.

Nevertheless, the user does not know where such hot spots are in the room, as their position is dependent on the geometry of the room. Therefore, the user shall empirically select the microphone position, which will usually not coincide with the location in which he/she watches the television screen.

This involves an apparent drawback, which will result in an less than optimal calibration of the sound projector.

Therefore, the need is felt for optimized calibration of the sound projector according to the location in which the user wants to watch the television.

BRIEF SUMMARY

One embodiment of the present disclosure is to provide an image display system and an associated optical instrument, that can obviate the above mentioned drawbacks of the described prior art.

One embodiment of the present disclosure includes a user-wearable optical instrument.

In one embodiment, the optical instrument comprises a frame and a pair of lenses, detection sensors and transmission devices, where the detection sensors are designed to receive at their input an audio signal having a frequency falling in a 20-20 kHz frequency band and to output a processed signal, and the transmission devices are designed to receive at their input the processed signal, and to output a calibration signal adapted to calibrate a sound projector.

Another embodiment of the present disclosure is an image display system, that comprises a television having a screen, a sound projector, a control unit in signal communication with the television screen and the sound projector, the control unit being configured for the sound projector to project one or more audible sound signals into a room and an optical instrument having a frame and a pair of lenses, detection sensors and transmission devices, where the detection sensors are designed to receive at their input an audio signal having a frequency falling in a 20-20 kHz frequency band and to output a processed signal, and the transmission devices are designed to receive at their input the processed signal, and to output a calibration signal, the control unit calibrating the sound projector according to the calibration signal.

Therefore, one embodiment provides an image display system and an associated optical instrument that can calibrate a sound projector according to the television-watching position of a user, by having the user wear the optical instrument.

Also, with the use of televisions having a technology that allows transmission of two distinct image streams (i.e., the so-called picture-in-picture or PIP feature, which is implemented, for instance in Blue-Ray and/or HD DVD specifications) and/or one stereoscopic image stream (i.e., a stream of three-dimensional images or in short 3D televisions), one embodiment can use a sound projector to project an audio signal for each image stream displayed on the television screen, so that the combination of the image stream and the audio signal is targeted to a particular optical instrument, and that optical instrument can calibrate the emission of audio signals from the sound projector.

BRIEF DESCRIPTION OF THE SEVERAL VIEWS OF THE DRAWINGS

The characteristics and advantages of the present disclosure will appear from the following detailed description of a practical embodiment, illustrated as a non-limiting example in the set of drawings, in which.

DETAILED DESCRIPTION

Figure 1:
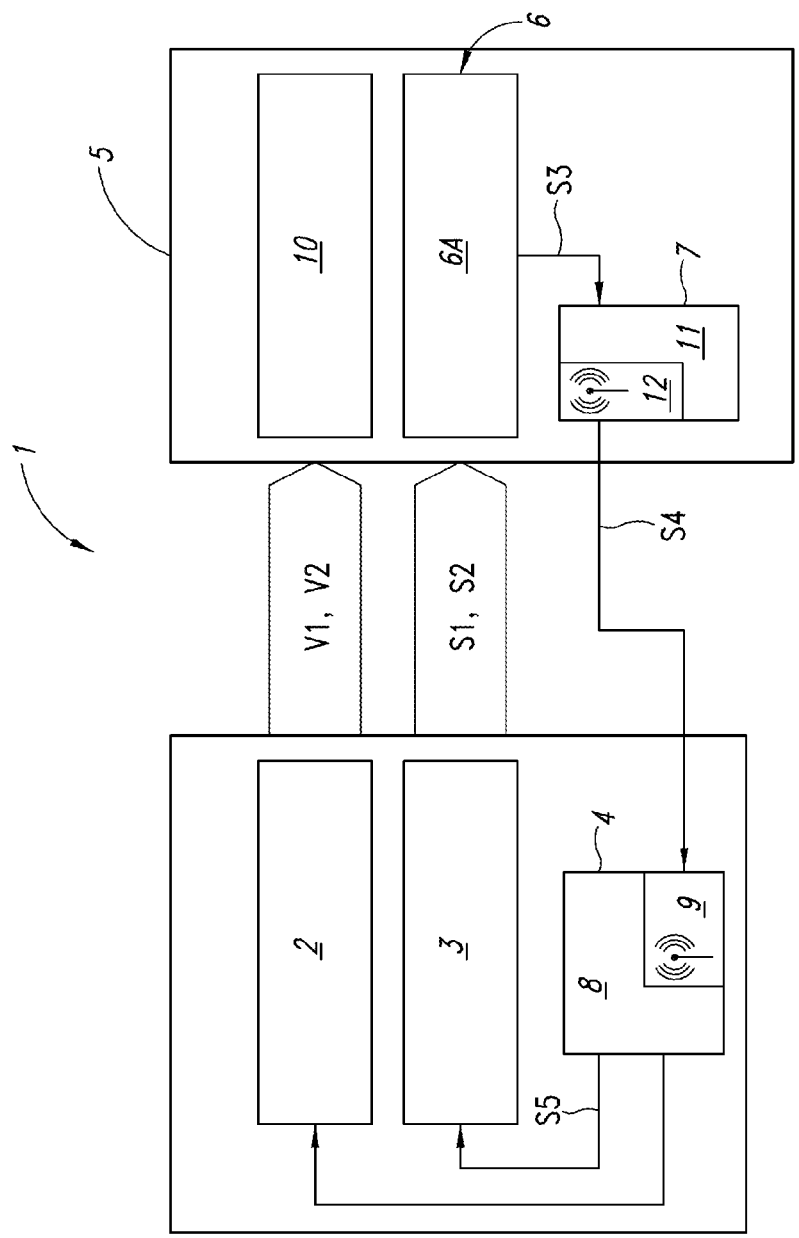
FIG. 1 shows a principle block diagram of the display system according to the present disclosure.

Although this is not expressly shown, the individual features described with reference to each embodiment shall be intended as auxiliary and/or interchangeable with other features, as described with reference to other embodiments.

It shall be noted that, as used herein, the term image designates an individual static frame, whereas the term image stream designates a sequence of frames that can create a video flow, i.e., the images displayed on a television screen.

Referring to the accompanying figures, numeral 1 designates an image display system that can be placed in a viewing environment, such as a room.

The display system 1 comprises:
- a television 2, having a screen, such as a screen with a LED, PLASMA or CRT technology,
- a sound projector 3,
- a control unit 4 in signal communication with the television screen 2 and the sound projector 3, for controlling the operation of the television 2 and the sound projector 3, through special firmware.

In one aspect, the television 2 is configured to display one image stream V1 and preferably also a second image stream V2.

For example, the television 2 is configured to display one image stream V1, or is configured to display a first image stream V1, such as a sports event, and at the same time an additional image stream V2, that may be different from such first image stream V1, or the television 2 is a 3D television that can display two stereoscopic image streams V1, V2.

The sound projector 3 is configured to project one or preferably two audio signals S1, S2. Such signals S1 and/or S2 are preferably of digital type. In one aspect, the signals S1 and/or S2 have a frequency falling in the 20-20 kHz frequency band. In other words, the signals S1, S2 fall in the audible frequency bands.

It shall be noted that the number of audio signals that can be emitted by the sound projector 3 is preferably equal to the number of image streams V1, V2 that can be displayed on the screen of the television 2.

The sound projector 3 may be arranged to be external to or preferably integrated in the television 2.

In one aspect, the sound projector 3 is manufactured with MEMS technology.

It shall be noted that, a sound projector manufactured with MEMS technology will be a device with improved performances as compared with a conventional loudspeaker.

Since current sound projection techniques are based on DSP, in conventional sound diffusion systems each element shall be controlled by a DAC. However, when the sound projector 3 is implemented with MEMS technology, digital to analog conversion D/A can be avoided, which will afford undoubted technical and economic advantages.

Furthermore, MEMS control of the sound projector 3 is directly provided on the individual MEMS elements, which will make it more efficient than conventional loudspeakers.

It shall be further noted that the sound projector 3 implemented with MEMS technology is free of the typical problem of saturation of a conventional loudspeaker membrane, and the sound projector 3 implemented with MEMS technology is not subject to clipping, because it is directly controlled by the driver.

Also, the sound projector 3 manufactured with MEMS technology has a lower harmonic distortion than a conventional membrane loudspeaker, which is also due to controlled saturation.

It shall be further noted that the number of components of the array of the sound projector 3 implemented with MEMS technology is definitely higher than in a conventional loudspeaker, and this characteristic improves the effectiveness of sound directivity.

Finally, the sound projector 3 implemented with MEMS technology is thinner, and can be directly integrated in the television 2, even in case of a flat-screen television.

In one aspect, the control unit 4 is configured to manage the television 2 and the sound projector 3, i.e., to ensure that an image stream V1, V2 has a respective audio signal S1, S2 associated therewith.

Therefore, the sound projector 3 emits an audio signal for each respective image stream; for example, the audio signal S1 is emitted for the image stream V1 and the audio signal S2 is emitted for the image flow V2.

The control unit 4 may be arranged to be external or, preferably, internal to the casing of the television 2.

Still referring to FIG. 1, it shall be noted that the audio signals S2, S2 spread out in the room in which the television 2, the sound projector 3 and the control unit 4 are located, to a plurality of paths.

In one aspect, the display system 1 comprises at least one optical instrument 5, which will be described below with particular reference to the components of the present disclosure.

Figure 2:
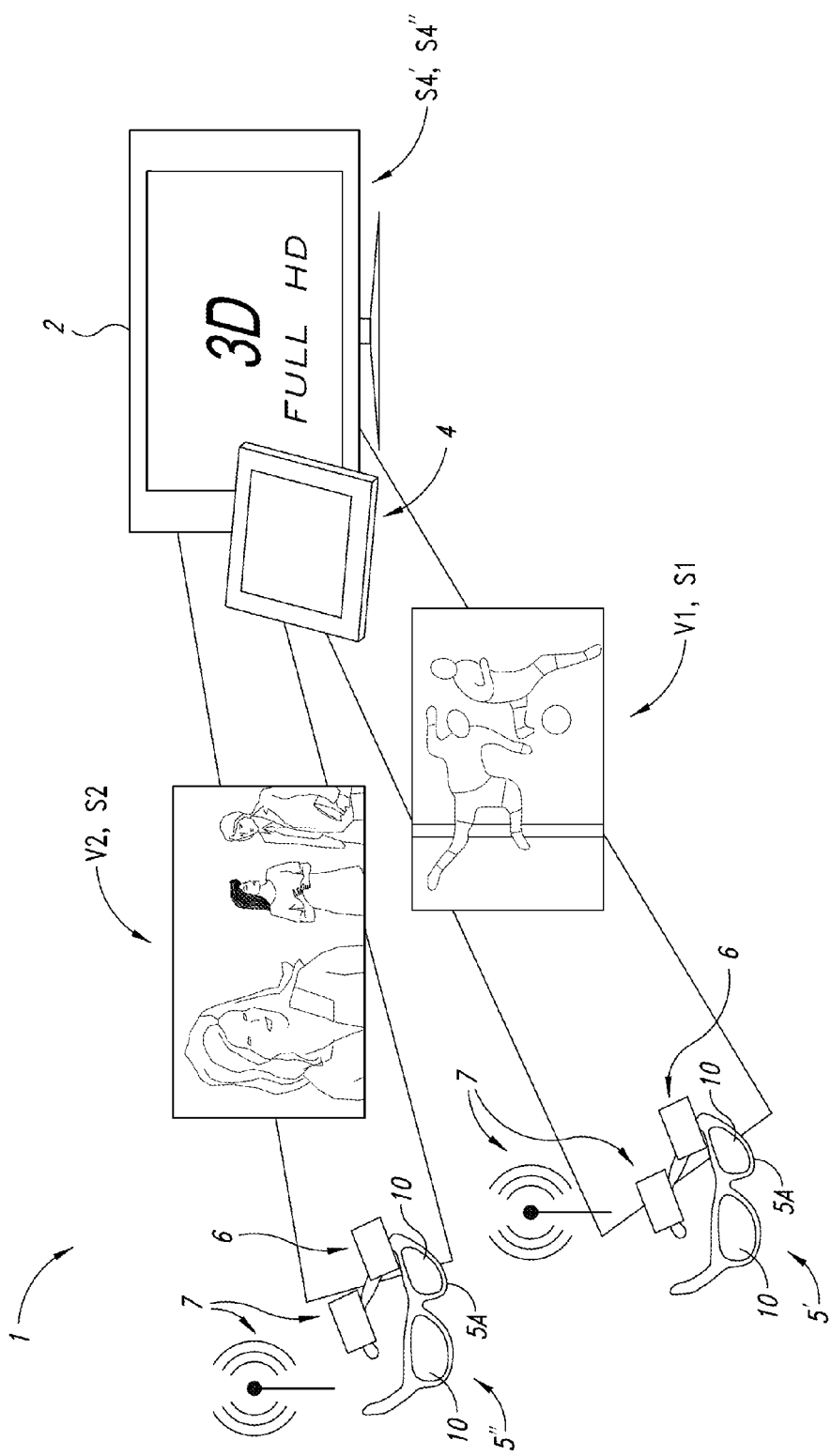
FIG. 2 shows a possible way of use of the display system according to of the present disclosure.

The optical instrument comprises a frame 5A and a pair of lenses 10, with the frame 5A being adapted to support the pair of lenses 10, see FIG. 2.

One embodiment of the optical instrument comprises detection sensors 6 and transmission devices 7, wherein:
 the detection sensors 6 are designed to detect or receive at their input the audio signal S1 or S2, e.g., generated by the sound projector 3, such audio signal S1 or S2 having a frequency falling in a 20-20 kHz frequency band, preferably in the audible frequency band, and to output a processed signal S3,
 the transmission devices 7 are designed to receive the detected signal S3 and to output a calibration signal S4.
For this purpose:
 the detection sensors 6 of the optical instrument 5 include a microphone 6A which is preferably manufactured with MEMS technology;
 the transmission system 7 comprises an advanced microphone processor 22 and a radio-frequency transmitter device 12.

In one aspect, the implementation of the microphone 6A with MEMS technology allows calibration of the system 1 and hence of the intensity information for the sound S1, S2 captured thereby, which has to be transmitted to the sound projector 3 via the transmission devices 7.

It shall be noted that, if the microphone 6A had an analog implementation, the output signal emitted from such analog microphone would be necessarily converted for transmission.

In one aspect, the implementation of the microphone 6A with MEMS technology allows the output signal S3 to be readily available in digital format, such that A/D conversion can be avoided.

Due to this feature, the output signal S3 is also immune from electromagnetic interference EM, which is a critical specification in a system integrating radio-frequency transmission devices 7.

In one aspect, the microphone 6A implemented with MEMS technology has a flat response throughout the 20-20 kHz band, and hence does not introduce sound intensity measurement errors in the signal S3.

In one aspect, the implementation of the microphone 6A with MEMS technology provides a small and light-weight device, which can be easily integrated in the optical instrument 5.

In one aspect, more than one MEMS microphone 6A may be integrated in the optical instrument 5, to generate multiple output signals S3, each for its respective microphone.

Concerning the advanced microphone processor 11, it is designed to receive the detected signal S3 and to generate a processed signal representative of characteristic parameters of the audio signal S1, S2.

Particularly, the advanced microphone processor 11 has two main purposes:
 converting the digital signal S1, S2 captured by the microphones from PDM (1-bit digital stream) to I2S (the most common format for digital sound);
 in case of integration of two or more microphones 6A in the optical instrument 5, processing the microphone signals S3 to direct their sensitivity (i.e., beamforming).
The processed digital signal is finally delivered to the radio-frequency transmitter 12 to be sent back to the control unit 4 through a digital calibration signal S4.

The advantage of including beamforming and sound directivity techniques in the optical instrument 5 is to increase the calibration effectiveness of the microphones 6A.

During calibration, the user might be close to walls or reflection-inducing elements and a system that can direct its sensitivity is immune from these less than ideal effects.

The radio-frequency transmitter device 12 receives the processed signal from the advanced microphone processor 11 and emits the calibration signal S4 over a 20-20 kHz frequency band, i.e., according to the IEEE 802.11 technical specifications.

In one aspect, the calibration signal S4 is a digital signal.

The control unit 4 receives such calibration signal S4 and operates to calibrate the sound projector 3.

For this purpose, the control unit 4 comprises a processing device 8 and a reception device 9, in which:
the reception system 9 is configured to receive at its input the calibration signal S4 and to output a processed calibration signal, which is transmitted to the processing device 8,
according to the processed calibration signal, the processing device 8 generates a control signal S5 that can calibrate the sound projector 3, such that the signal S1, S2 has an even distribution throughout the frequency spectrum.

For this purpose, sound projection techniques focus the beam of the signals S1, S2. In order to provide a directional sound, they use constructive and destructive interference of waves at various wavelengths. For the beam to be focused in a particular direction, the interference must be constructive, considering the target direction, and the otherwise directed sound must be eliminated.

An example of such techniques is disclosed in US20060153391.

In one embodiment, the reception system 9 comprises a radio-frequency receiving device having a frequency band compatible with the frequency band of the transmission device 7.

It shall be noted that the optical instrument 5 is adapted to be worn by a user and, in a preferred embodiment, it consists of a device in the form of common eyeglasses.

In one aspect of the present disclosure, the detection sensors 6 and the transmission system 7 are associated with the frame 5A of the optical instrument 5, which comprises a front and at least one temple constrained by said front.

In one embodiment, the detection sensors 6 and the transmission system 7 may be associated to the front and/or the temple via suitable linkages.

According to an alternative embodiment, the detection sensors 6 and the transmission system 7 are embedded in the frame 5A of the eyeglasses.

For instance, the detection sensors 6 and the transmission system 7 may be located within the thickness of the front and/or the temple.

This is advantageous in that the detection sensors 6 and the transmission system 7 are hidden to the user's view.

Therefore, the control unit 4 calibrates the sound projector 3 according to the calibration signal S4 generated by the optical instrument 5, which in turn is preferably located in the position in which a user watches the television 2.

Referring to FIG. 2, a possible employment of the optical instrument 5 and hence the display system 1 is shown.

In one aspect of the display system 1, as shown in FIG. 2, two distinct optical instruments 5', 5" are provided in addition to the television 2. Particularly, two distinct image streams V1, V2 may be simultaneously displayed on the screen of the television, and the sound projector 3 projects two audio signals S2, S2, each directed to its own optical instrument.

For instance, the exemplary configuration of FIG. 2 shows an image stream V1, such as a sports event, with its own audio stream S1, and an image stream C2, such as a soap opera, with its audio stream S2, where the image steam V1—audio signal S1 pair is designed for the optical instrument 5', whereas the image stream V2—audio signal S2 pair is designed for the optical instrument 5".

In one aspect:
the television 2 consists, for instance, of a stereoscopic television (and/or a television having a picture in picture feature),
the sound projector 3 is manufactured, for instance, with MEMS technology and
the optical instruments 5', 5" are of the type having lenses adapted for displaying and viewing stereoscopic images respectively.

In one aspect, the control unit 4 is configured to ensure that the image stream V1 displayed by the television 2 is combined (or interlaced) with its audio signal S1 projected by the sound projector 3, the same being applicable with the image stream V2 and its audio signal S2.

Such image stream-audio signal pairs V1, S1 and V2, S2 are captured by the sensors 6 (i.e., the MEMS microphones 6A) of a respective optical instrument 5' and 5", which may be worn by respective users.

In one aspect, the image stream-audio signal pair V1, S1 is designed, for instance, for the optical instrument 5', whereas the other pair V2, S2 is designed, for instance, for the other optical instrument 5".

Each optical instrument 5' and 5" will emit its calibration signal S4', S4" to calibrate the sound projector 3 for emission of the two audio signals S1 and S2 towards their respective optical instruments 5', 5".

In other words, the sound projector 3 will calibrate both audio signals S1 and S2 for the latter to be projected towards their respective optical instruments 5' and 5" in the proper direction, according to their respective calibration signals S4', S4".

Therefore, the optical instrument 5' may allow a user to view the image stream V1 only, with the corresponding audio signal S1 being projected by the sound projector 3 exactly in the direction of the optical instrument 5', which can generate its own calibration signal S4' (via its transmission system 7).

The other optical instrument 5" will allow another user to view the image stream V2 only, with the corresponding audio signal S2 being projected by the sound projector 3 exactly in the direction of the optical instrument 5", which can generate its own calibration signal S4" (via its transmission system 7).

In this respect, the pair of lenses 10 of the optical instrument 5 may be either or active or preferably passive type.

In one aspect, the lenses 10 may be designed for filtered viewing of a single image stream, i.e., the image stream V1 or the image stream V2, by linear or circular polarization of the lenses 10.

In one aspect, the pair of lenses 10 may be identically polarized, i.e., the left eye lens has the same polarization as the right eye lens.

Therefore, an optical instrument such as the optical instrument 5' will be configured for viewing the image stream V1 only, whereas the other optical instrument, i.e., the optical instrument 5″ will be designed for viewing the image stream V2 only.

Since the sound projector 3 projects the audible audio signal S1 towards a target optical instrument, e.g., the optical instrument 5′, and the same applies to the audible audio signal S2, then a television system 1 is provided that, through the control unit 4, is configured for:

the television 2 to simultaneously provide two image streams V1, V2, the sound projector 3 to project the audio signals S1, S2 towards their respective optical instruments 5′, 5″, the control unit 4 to associate each image stream V1, V2 with its audio signal S1, S2, each optical instrument 5′, 5″ worn by a respective user allows viewing of its image stream (e.g., the stream V1 or V2) and detection of the associated audible audio signal (e.g., the signal S1 or S2 respectively) and calibration of the sound projector 3 by the respective calibration signals S4′, S4″, to project the audio signals S1, S2 exactly in the direction of the optical instrument 5′, 5″ respectively.

Therefore, a user that wears the optical instrument 5′ will only view the image flow V1 and hear the audio signal S1, the latter being also detected by the sensors 6 of the optical instrument 5′ to generate a calibration signal S4′ which is in turn sent to the sound projector 3 to calibrate the emission of the audio signal S1 in the exact direction of the optical instrument 5′ only. The same applies to the optical instrument 5″.

Those skilled in the art will appreciate that a number of changes and variants may be made to the optical instrument and the display instrument as described hereinbefore to meet specific needs, without departure from the scope of the disclosure, as defined in the following claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a first frame configured to be worn by a first user;
   first detection sensors affixed to the first frame and configured to detect as an input a first audible audio signal from an electronic entertainment device and configured to output a first processed signal based on the first audible audio signal; and
   a first transmission system affixed to the first frame, the first transmission system including:
      a first processor configured to receive as an input the first processed signal from the first detection sensors and configured to generate and output a first calibration signal based on the first processed signal, the first calibration signal configured to calibrate the electronic entertainment device to project the first audible audio signal in a direction towards a current location of the first frame;
      a first transmitter configured to transmit the first calibration signal to the electronic entertainment device;
   a second frame configured to be worn by a second user;
   second detection sensors affixed to the second frame and configured to detect as an input a second audible audio signal from the electronic entertainment device and configured to output a second processed signal based on the second audible audio signal; and
   a second transmission system affixed to the second frame, the second transmission system including:
      a second processor configured to receive as an input the second processed signal from the second detection sensors and configured to generate and output a second calibration signal based on the second processed signal, the second calibration signal configured to calibrate the electronic entertainment device to project the second audible audio signal in a direction towards a current location of the second frame, the second calibration signal being different from the first calibration signal; and
      a second transmitter configured to transmit the second calibration signal to the electronic entertainment device.

2. The system of claim 1 wherein the first detection sensors include a microphone, and the first audible audio signal is a digital signal.

3. The system of claim 2 wherein said microphone is a MEMS microphone.

4. The system of claim 1 wherein the first transmitter is a radio-frequency transmitter device.

5. The system of claim 4 wherein said radio-frequency transmitter device is configured to emit said calibration signal in a 20-20 kHz frequency band.

6. The system of claim 1 further comprising a pair of lenses supported by the first frame and are configured to view stereoscopic images.

7. The system of claim 6 wherein a first lens of said pair of lenses has a different polarization than a second lens of said pair of lenses.

8. The system of claim 6 wherein a first lens of said pair of lenses has a polarization that is substantially identical to a polarization a second lens of said pair of lenses.

9. The system of claim 1 wherein the first frame includes a front portion and side temple portions constrained by said front portion.

10. The system of claim 1 wherein the first detection sensors and the first transmission system are embedded in the first frame, and the first frame includes a front portion and side temple portions constrained by said front portion.

11. The system of claim 1 wherein the first calibration signal is configured to calibrate the electronic entertainment device to adjust the first audible audio signal to project in a direction towards the current location of the first frame from a previous location of the first frame.

12. A system, comprising:
   an entertainment system that includes:
      a television having a screen configured to display a first image stream and a second image stream;
      a sound projector configured to project a first audible audio signal associated with the first image stream and a second audible audio signal associated with the second image stream; and
      a control unit configured to communicate with said screen and said sound projector;
   a first optical instrument that includes:
      a first frame configured to be worn by a first user; and
      first detection sensors affixed to the first frame, the first detection sensors configured to detect at an input the first audible audio signal from the sound projector and configured to output a first processed signal based on the first audible audio signal, the first processed signal indicating a parameter of the first audible audio signal; and a first transmission system affixed to the first frame, the first transmission system including:

a processor configured to receive at an input said first processed signal, the processor configured to generate, at a current location of the first optical instrument, a first calibration signal based on the first processed signal, the first calibration signal adapted to calibrate the sound projector to project the first audible audio signal in a direction towards the current location of the first optical instrument; and a transmitter configured to transmit the first calibration signal from the current location of the first optical instrument to the control unit, said control unit being configured to receive the first calibration signal from the transmitter and being configured to perform, in response to the control unit receiving the first calibration signal from the transmitter, calibration of the sound projector according to said first calibration signal; and a second optical instrument that includes:

a second frame configured to be worn by a second user; and second detection sensors affixed to the second frame, the second detection sensors configured to detect at an input the second audible audio signal from the sound projector and configured to output a second processed signal based on the second audible audio signal, the second processed signal indicating a parameter of the second audible audio signal; and a second transmission system affixed to the second frame, the second transmission system including:

a processor configured to receive at an input said second processed signal, the processor configured to generate, at a current location of the second optical instrument, a second calibration signal based on the second processed signal, the second calibration signal adapted to calibrate the sound projector to project the second audible audio signal in a direction towards the current location of the second optical instrument, the second calibration signal being different from the first calibration signal; and a transmitter configured to transmit the second calibration signal from the current location of the second optical instrument to the control unit, said control unit being configured to receive the second calibration signal from the transmitter and being configured to perform, in response to the control unit receiving the second calibration signal from the transmitter, calibration of the sound projector according to said second calibration signal.

13. The system as claimed in claim 12 wherein said control unit includes:

a processing device; and a reception system configured to receive at an input the first calibration signal and to output a first processed calibration signal, said processing device being configured to receive said first processed calibration signal and generate a first control signal to calibrate said sound projector.

14. The system as claimed in claim 13 wherein said reception system includes a radio-frequency receiving device having a frequency band compatible with a frequency band of said transmission system.

15. The system as claimed in claim 12 wherein said sound projector is manufactured with MEMS technology.

16. A system, comprising:

a display device having a control unit;

a first wearable device configured to interact with the display device to receive an audio component of a first data stream from the display device, the first wearable device including:

first detection sensors affixed to the first wearable device, the first detection sensors configured to receive the audio component from the first data stream from the display device and to generate a first detection signal based on the audio component of the first data stream, the first detection signal indicating a parameter of the audio component of the first data stream;

a first processor affixed to the first wearable device, the first processor configured to receive the first detection signal and generate a first calibration signal based on the first detection signal, the first calibration signal being configured to calibrate the display device to project the audio component of the first data stream in a direction towards the first wearable device; and a first transmitter affixed to the first wearable device, the first transmitter configured to receive the first calibration signal, and to transmit the first calibration signal to the control unit in the display device;

a second wearable device configured to interact with the display device to receive an audio component of a second data stream from the display device, the second wearable device including:

second detection sensors affixed to the second wearable device, the second detection sensors configured to receive the audio component from the second data stream from the display device and to generate a second detection signal based on the audio component of the second data stream, the second detection signal indicating a parameter of the audio component of the second data stream;

a second processor affixed to the second wearable device, the second processor configured to receive the second detection signal and generate a second calibration signal based on the second detection signal, the second calibration signal being different from the first calibration signal, the second calibration signal being configured to calibrate the display device to project the audio component of the second data stream in a direction towards the second wearable device; and a second transmitter affixed to the second wearable device, the second transmitter configured to receive the second calibration signal, and to transmit the second calibration signal to the control unit in the display device.

17. The system of claim 16 wherein the first wearable device is configured to receive only the first data stream, based on the first calibration signal and the second wearable device is configured to receive only the second data stream, based on the second calibration signal.

18. The system of claim 16 wherein the first and second detection sensors include a MEMS microphone.

* * * * *